United States Patent
Gauthier et al.

(10) Patent No.: US 10,607,176 B2
(45) Date of Patent: *Mar. 31, 2020

(54) BUILDING BUSINESS OBJECTS BASED ON SANKEY DIAGRAM

(71) Applicant: SAP SE, Walldorf (DE)

(72) Inventors: Alain Gauthier, Montreal (CA); James Zdralek, Montreal (CA); Wanling Zhang, Montreal (CA); Ghufran Iftikhar, Vaudreuil-Dorion (CA); Rischa Poncik, Dorval (CA); Roy Ghorayeb, Montreal (CA); Mohannad El-Jayousi, L'Ile-Bizard (CA); Farid Toubal-Seghir, Laval (CA)

(73) Assignee: SAP SE, Walldorf (DE)

( * ) Notice: Subject to any disclaimer, the term of this patent is extended or adjusted under 35 U.S.C. 154(b) by 911 days.

This patent is subject to a terminal disclaimer.

(21) Appl. No.: 14/821,437

(22) Filed: Aug. 7, 2015

(65) Prior Publication Data
US 2017/0039491 A1 Feb. 9, 2017

(51) Int. Cl.
G06Q 10/00 (2012.01)
G06Q 10/06 (2012.01)
G06T 11/20 (2006.01)

(52) U.S. Cl.
CPC ..... *G06Q 10/067* (2013.01); *G06Q 10/06316* (2013.01); *G06T 11/206* (2013.01); *G06T 2200/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,650,492 | B1 * | 2/2014 | Mui | H04L 43/045 |
| | | | | 715/736 |
| 9,021,361 | B1 * | 4/2015 | Pettinati | G06F 3/048 |
| | | | | 715/736 |
| 2008/0162268 | A1 * | 7/2008 | Gilbert | G06Q 10/06375 |
| | | | | 705/7.29 |
| 2015/0112894 | A1 * | 4/2015 | Lingappa | G06Q 30/0202 |
| | | | | 706/11 |
| 2016/0063072 | A1 * | 3/2016 | N | G06F 16/248 |
| | | | | 707/722 |
| 2016/0117703 | A1 * | 4/2016 | Woddi | G06Q 30/0204 |
| | | | | 705/7.33 |
| 2016/0357402 | A1 * | 12/2016 | Matas | G06T 11/60 |
| 2017/0098318 | A1 * | 4/2017 | Iannaccone | G06F 3/0485 |

* cited by examiner

*Primary Examiner* — William S Brockington, III
*Assistant Examiner* — Scott M Ross
(74) *Attorney, Agent, or Firm* — Jones Day

(57) ABSTRACT

Methods and systems of the present disclosure provide techniques for analyzing behavior of and triggering action for a definable group. In an embodiment, a method may identify a group based on a Sankey diagram. For example, a group may include those users belonging to a journey or path of the Sankey diagram. The method may analyze behavior of the group, e.g., whether a group characteristic meets a pre-definable condition. The method may perform an action for the group. In an embodiment, the method may automatically identify group members and/or automatically perform at least one action for the group members based on satisfaction of the pre-definable condition.

20 Claims, 8 Drawing Sheets

100

200

400

300

500

600

700

750

800

US 10,607,176 B2

BUILDING BUSINESS OBJECTS BASED ON SANKEY DIAGRAM

CROSS-REFERENCE TO RELATED APPLICATIONS

This application is being filed concurrently with U.S. patent application Ser. No. 14/821,476 entitled "Generating Metadata and Visuals Related to Mined Data Habits," U.S. patent application Ser. No. 14/821,465 entitled "Rendering Details From User Selections of Mined Data Habits," U.S. patent application Ser. No. 14/821,332 entitled "Sankey Diagram Graphical User Interface Customization," and U.S. patent application Ser. No. 14/821,446 entitled "Simplification of Sankey Diagram," the entireties of each of which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

FIELD OF THE DISCLOSURE

The present disclosure relates to a method and system for visualizing data and performing functions for at least a subset of the visualized data. More specifically, it relates to creating at least one group using a Sankey diagram and triggering an action for the at least one group.

BACKGROUND

Visual representation of data can give meaning to information by helping users to understand and analyze data. Effective data visualization can make data more accessible and understandable. With the increase in Internet speeds and proliferation of sensors in the environment, data is generated at greater rates than ever before. These data sets are typically so large and complex that manual procedures and traditional data processing applications are inadequate to handle analysis of such data sets. Nevertheless, visualization of these data sets can be helpful to identify business trends, troubleshoot and improve the provision of energy and computing resources, prevent diseases, combat crime, and the like.

One type of data visualization is a Sankey diagram. Conventionally, Sankey diagrams have been used to show density or magnitude, e.g., in flow of natural resources such as energy, petroleum, electricity, etc. Early applications of the Sankey diagram include Matthew Sankey's diagram of the energy efficiency of a steam engine and Charles Minard's diagram of Napoleon's Russian Campaign of 1812. The inventors perceived a need for more effective visual display of and manipulation of data and the potential of interactive Sankey diagrams to response to such needs.

DETAILED DESCRIPTION

Figure 1:
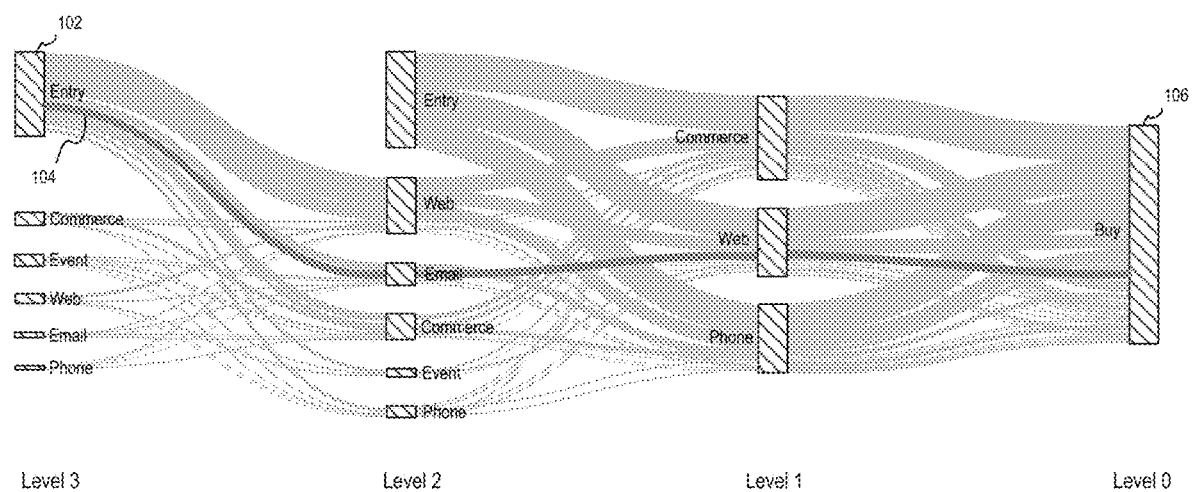
FIG. 1 is a Sankey diagram according to an embodiment of the present disclosure.

Methods and systems of the present disclosure provide techniques to develop and render Sankey diagrams to model flow of processes. The methods and systems described herein find application in fields such as marketing, supply chain operation and management, monitoring electricity grid performance, public health and safety, and the like. In contrast to conventional Sankey diagrams, which are limited to illustrating energy flow, the methods and systems described herein provide a Sankey diagram to model data and processes traditionally not represented by Sankey diagrams, provide for interactive display and manipulation of data in a Sankey diagram, and respond to manipulations of data in the Sankey diagram by performing pre-definable functions.

Method and systems of the present disclosure provide methods, systems, and computer-readable media for building a business object based on a Sankey Diagram. In an embodiment, a method may create a group based on elements of a Sankey diagram. The method may populate the group with those elements of the Sankey diagram meeting one or more member criterion. The method may associate an action with the group. The method may determine that the group meets one or more group criterion. The method may trigger the associated action in response to the determination that the group meets the group criteria.

Real-world processes such as business transactions may be challenging to model and analyze in the context of computer networking. One technological solution for modeling a real-world process is to use a "business object" to represent or model an aspect of the process. For instance, a business object may represent an action. By way of non-limiting example, the business object may represent one or more steps of: a marketing campaign, creating a newsletter, generating a sales report, and the like. A business object may be built or modified based on a Sankey diagram according to the methods and systems described herein.

One example of a real-world process is customer experience. A Sankey diagram may be useful to model customer experience. A customer's experience over time may be evaluated by a user such as vendor or market analyst to determine the efficacy of various marketing tactics. The customer's experience may be leveraged by the user to make decisions about future marketing tactics, e.g., to encourage completion of a purchase. For example, the information displayed in the Sankey diagram may help a user to understand why a customer did not complete a purchase. By way of non-limiting example, causes of incomplete purchases may include a lost Internet connection and a negative experience with a customer call center. Remedies may then be carried out to address issues arising in the customer experience. To encourage the customer to complete a purchase or to prevent future losses, the user may then trigger an action. Actions may include, among others, providing a discount to a customer and making a follow-up call to the customer. These triggered actions may be represented as business objects. For example, when an action is triggered, a business object is built. For example, when an action is triggered, a method of the present disclosure may create a campaign business object. The campaign business object may provide an email to a user. The email may be targeted to a group of users. If a user does not respond, the method may further send a message, e.g., an SMS, to follow-up and further entice a purchase.

FIG. 1 is a Sankey diagram 100 according to an embodiment of the present disclosure. The Sankey diagram 100 may represent a sequence of steps taken in a marketing and purchase process. In such a process, a participant (also referred to as a "customer") may encounter and interact with various platforms and campaigns. The customer may make various decisions and teach various milestones (e.g., commerce, event, web, email, phone, etc.) before ultimately making a purchase. Knowledge about a particular path or journey a customer takes can enable users to appropriately respond to issues that may arise in the path or journey.

The Sankey diagram 100 may include a target event 106, one or more milestones (represented by the shaded boxes), and one or more paths to reach the target event 106. A path may represent a customer experience over time. As shown, a path may traverse one or more milestones (also referred to as nodes) including: commerce, event, web, email, phone, etc. For example, "commerce" may represent a customer visit to an e-commerce website, "event" may represent customer participation in a marketing event such as an online discussion, "web" may represent customer interaction with a type of website such as a social networking website, "email" may represent a customer's reading or interaction with an email message related to the purchase, and "phone" may represent a customer's interaction with customer service. Other milestones are of course possible, including milestones taking place in the real world rather than in the virtual world. An "entry" may represent a step before a milestone, for example a beginning of observing and/or recording a customer's actions.

In an embodiment (as shown), a customer may reach the target event 106 via one or more milestones. Example path 104 shows how a customer may begin at milestone 102 and reach the target event 106 via milestones "email" and "web." Each grouping of milestones is represented as a level in FIG. 1. For example, Level 0 includes the target event; Level 1 includes milestones commerce, web, and phone; Level 2 includes milestones entry, web, email, commerce, event, and phone; and Level 3 includes milestones entry, commerce, event, web, email, and phone. Some customers may make a purchase decision relatively quickly, while others may not. Those customers who make a purchase after an initial contact would be represented by a path between nodes at Level 1 and Level 0 (the purchase). A relatively short path would be one that begins at Level 2 and ends at Level 0, e.g., the path connecting entry (at Level 2), commerce (at Level 1), and buy (at Level 0). Those customers who may take more steps to the target event may be represented by a path at deeper levels.

In an embodiment, a path taken by a customer may be represented by a line connecting two or more nodes, as shown in the Sankey diagram 100. A thickness of a path may represent a density of that path such that the more customers that use that path to reach the target event, the thicker the line. The paths may represent trends in how customers make a purchase. Example path 104 shows how a customer may begin at milestone 102 and reach the target event 106 via milestones "email" and "web." The path is represented by a relatively thin line, which means that this is relatively less popular manner to reach the target event, "Buy."

In an embodiment, the Sankey diagram 100 may be configurable. Methods and systems for configuring the Sankey diagram are further described in the cross-referenced related applications. For example, a user may define a level of detail shown in the diagram, specify a depth-level of the Sankey diagram, etc.

Figure 2:
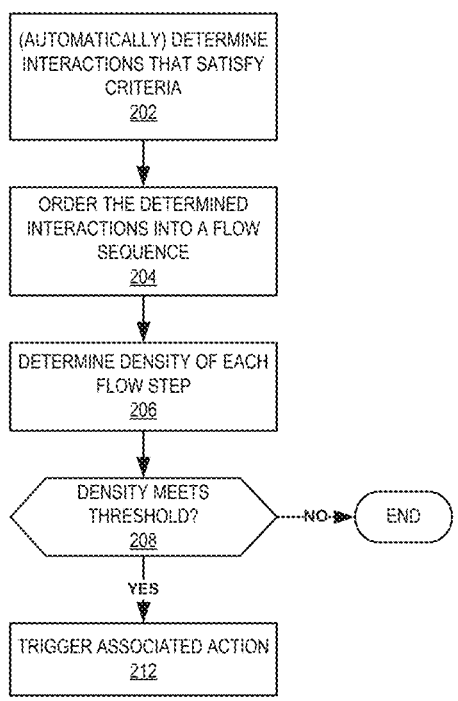
FIG. 2 is a flowchart illustrating a method of triggering an automated action based on a Sankey diagram according to an embodiment of the present disclosure.

FIG. 2 is a flowchart illustrating a method 200 of triggering an automated action based on a Sankey diagram according to an embodiment of the present disclosure. The method 200 may create infrastructure for taking action in response to customer interactions satisfying one or more conditions (also referred to as criteria). For example, an action may be performed for those customers who have made a particular journey or taken a particular path.

The method 200 may first determine interactions that satisfy one or more criterion ("criteria" for simplicity) (box 202). In an embodiment, interactions may be determined based on a Sankey diagram. For example, an interaction may be a context, a type of customer, a milestone, etc. A context may describe types of interactions that a customer has with a company. A context may include a visit to a website, a download from a website, registration with a website, and the like. The method may then order those interactions that satisfy the criteria into a flow sequence (box 204). For each element of the flow sequence (also referred to as a "step" in the flow sequence), the method 200 may determine a density of the element (box 206). In an embodiment, the density of the element reflects a number of customers associated with the element. For example, the number of customers associated with the element may be those customers who have traversed that milestone or node. The method 200 may then determine whether the density meets a threshold value (box 208). If the density does not meet the threshold value, the method 200 may end. Otherwise, if the density meets the threshold value, the method 200 may trigger an associated action (box 212). The action may be configurable, as further described herein. That is, the method may build a business object.

By way of non-limiting example, the method 200 may operate as follows to trigger an automated action to encourage customer completion of a purchase. Suppose that predefined criteria establishes that "email" and "commerce" are of interest. This may mean that "email" and "commerce" satisfies the criteria. The method 200 may then form a flow sequence "email, commerce," and determine a density for each step of the flow sequence. If the determined density meets a threshold, the method 200 may then trigger an associated action. In this example, the associated action may be creating and/or dispatching an email notifying a customer that the product in the customer's cart has been discounted. This action may incentivize the customer to complete the purchase.

In an embodiment, whether criteria are met may be automatically determined at the time the Sankey diagram is rendered (box 202). For instance, the method may automatically determine whether criteria are met by the Sankey diagram. In an alternative embodiment, whether a criteria is met may be determined manually (box 202), e.g., based on user filtering to reach the meeting of the criteria. Upon meeting the criteria, the method may then trigger or "fire" the action. The method 200 may be performed on Sankey diagrams, for example the Sankey diagrams shown in FIGS. 1, 3, and 5.

In an embodiment, a customizing table (also referred to as "a setting table") may define an action associated with criteria. The criteria may be one or more aspects of the Sankey diagram such as a sequence of milestones (flow), density, business context, etc. When one or more criterion is met, the method 200 may trigger an action. Table 1 shows an example customization table to associate an action with criteria of a Sankey diagram. For example, when a flow sequence is email, commerce, social, web, an automatic action may be triggered to email customers involved in the flow sequence to encourage social media exposure such as to increase "Likes" on Facebook®, "Retweets" on Twitter®, "Pins" on Pinterest®, etc.

TABLE 1

| Business Context | Flow Sequence | Density (in customers) | Action |
| --- | --- | --- | --- |
| Support | Commerce, Web, Phone | ~200 to ~300 | Send alert to responsible account/user |
| Abandoned Cart | Email, Commerce | ~100 to ~200 | Create email for discount campaign of product in cart |
| Social | Email, Commerce, Social, Web | ~200 to ~300 | Create email campaign to increase social media exposure |
| Server | On, Network Shortage | ~1 to ~5 | Sent an alert to system administrator |

As shown in Table 1, the triggered actions may include business decisions such as alerting a responsible user (also referred to as an account), providing a discount on a product or service, increasing visibility of a product or service by generating interest on social media, etc.

Figure 3:
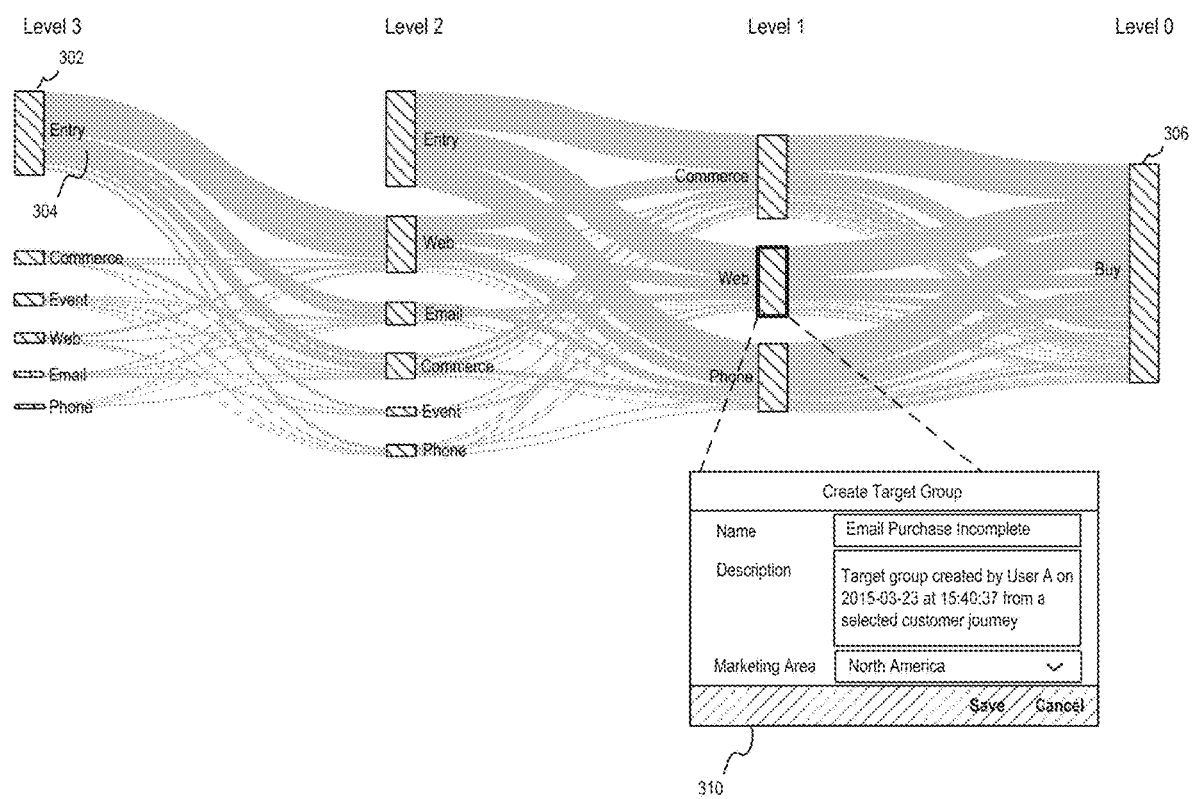
FIG. 3 is a Sankey diagram showing a group creation function according to an embodiment of the present disclosure.

FIG. 3 is a Sankey diagram 300 showing a group creation function according to an embodiment of the present disclosure. The Sankey diagram 300 may represent a sequence of steps taken in a marketing and purchase process. In such a process, a participant (also referred to as a "customer") may encounter and interact with various platforms and campaigns. The customer may make various decisions and teach various milestones (e.g., commerce, event, web, email, phone, etc.) before ultimately making a purchase. Knowledge about a particular path or journey a customer takes can enable users to appropriately respond to issues that may arise in the path or journey.

The Sankey diagram 300 may include a target event 306, one or more milestones (represented by the shaded boxes), and one or more paths to reach the target event 306. A path may represent a customer experience over time. As shown, a path may traverse one or more milestones (also referred to as nodes) including: commerce, event, web, email, phone, etc. For example, "commerce" may represent a customer visit to an e-commerce website, "event" may represent customer participation in a marketing event such as an online discussion, "web" may represent customer interaction with a type of website such as a social networking website, "email" may represent a customer's reading or interaction with an email message related to the purchase, and "phone" may represent a customer's interaction with customer service. Other milestones are of course possible, including milestones taking place in the real world rather than in the virtual world. An "entry" may represent a step before a milestone, for example a beginning of observing and/or recording a customer's actions.

In an embodiment (as shown), a customer may reach the target event 306 via one or more milestones. Each grouping of milestones is represented as a level in FIG. 3. For example, Level 0 includes the target event; Level 1 includes milestones commerce, web, and phone; Level 2 includes milestones entry, web, email, commerce, event, and phone; and Level 3 includes milestones entry, commerce, event, web, email, and phone. Some customers may make a purchase decision relatively quickly, while others may not. Those customers who make a purchase after an initial contact would be represented by a path between nodes at Level 1 and Level 0 (the purchase). A relatively short path would be one that begins at Level 2 and ends at Level 0, e.g., the path connecting entry (at Level 2), commerce (at Level 1), and buy (at Level 0). Those customers who may take more steps to the target event may be represented by a path at deeper levels.

In an embodiment, a path taken by a customer may be represented by a line connecting two or more nodes, as shown in the Sankey diagram 300. A thickness of a path may represent a density of that path such that the more customers that use that path to reach the target event, the thicker the line. The paths may represent trends in how customers make a purchase.

In an embodiment, the Sankey diagram 300 may be configurable. Methods and systems for configuring the Sankey diagram are further described in the cross-referenced related applications. For example, a user may define a level of detail shown in the diagram, specify a depth-level of the Sankey diagram, etc.

The create target group dialog box 310 may be a user interface element by which a user may create a target group for which to perform an action (e.g., build a business object). In an embodiment, the group may be a group of customers who are targets for a marketing campaign. For instance, the target group may include those customers reaching the "web" milestone via "email." In an embodiment, a user may complete the portions in the create target group dialog box 310 corresponding to "name," "description," and "marketing area." In an alternative embodiment, one or more of these boxes may be automatically populated.

The name box may include a description of the target group to allow for identification of the group. As shown, the description may include information about when and how a group is created. The marketing area may provide additional filtering to form the group. For example, the marketing area may indicate a geographical or other area of focus. In the example shown, the customers of interest are those associated with North America. As shown, the information relating to the target group may be saved or simply abandoned ("canceled.")

In operation, the create target group dialog box 310 may be rendered on a user interface in response to selection of one or more milestones, for example in response to selection of the "web" milestone as shown in FIG. 3. That is, in the example shown in FIG. 3, the create target group dialog box 310 may appear on a user interface if a user selects the "web" milestone highlighted in the Sankey diagram 300.

Figure 4:
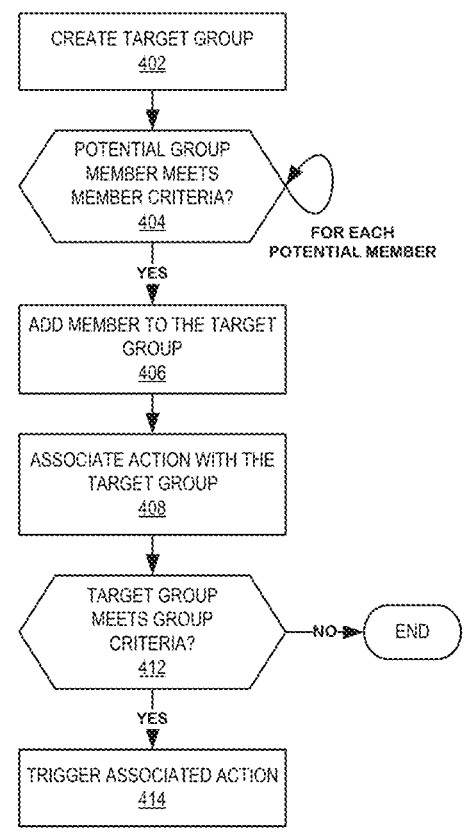
FIG. 4 is a flowchart of a method for creating a group and performing a function for the group according to an embodiment of the present disclosure.

FIG. 4 is a flowchart illustrating a method 400 of triggering an automated action based on a Sankey diagram. The method 400 may create infrastructure for taking action for a pre-definable group of customers. An action may be performed for those customers who have made a particular journey or taken a particular path.

The method 400 may include creating a target group (box 412). In an embodiment, the target group in an initial state may include no members. In another embodiment, the target group in an initial state may include all or some potential members. The method 400 may then determine whether a potential group member meets member criteria (box 404). Member criteria may be pre-defined. For example, member criteria may be one or more aspects of the Sankey diagram such as a sequence of milestones (flow), business context, etc. If the method 400 determines that a potential group member meets the member criteria, the method may then proceed to add (or confirm) the member to the target group (box 406). Otherwise, if the method 400 determines that a potential group members does not meet the member criteria, the method may proceed to the next potential group member and perform box 404 for the next potential group member until all potential group members are evaluated.

The method 400 may associate an action (or function) with the target group (box 408). In an embodiment, the action may be dynamically associated with the target group as content becomes selected or de-selected in the Sankey diagram. The method 400 may determine whether the target group meets group criteria (box 412). Group criteria may include density and/or other aspects of a flow sequence of the Sankey diagram. In an embodiment, the group criteria may be based on criteria from the customizing table. If the method 400 determines that the target group does not meet the group criteria, the method 400 may end. Otherwise, if the target group does meet the group criteria, the method 400 may trigger an associated action (box 414). The action may be configurable. In an embodiment, the method 400 may be performed as part of another method. For example, the method 400 may be performed as part of boxes 202-208 in method 200 shown in FIG. 2.

Table 2 provides examples of business actions that may trigger associated business actions. In an embodiment, action may be associated with a context such that a user action triggers a business action in a particular context but not in another context. For example, as shown, a user command to "create target group" would trigger creation of a target group provided that the present context is "marketing."

TABLE 2

| Business Context | Business Action | User Action |
| --- | --- | --- |
| Marketing | Create Target Group | Select "Create Target Group" |
| Marketing | Create Marketing Campaign | Select node in Sankey diagram |
| Inventory Management | Order Product | Select Inventory State UI element |
| Support | Call Customer | Select Sentiment UI element |

By way of non-limiting example, the method 400 may operate as follows to trigger an automated action to encourage customer completion of a purchase. The method 400 may form a group may include those users who have an item in a shopping cart, but have not yet completed a purchase. In an embodiment, the group may be automatically formed. In an alternatively embodiment, the group may be manually formed by a user, e.g., via manipulation of the Sankey diagram. The method 400 may then send an email reminding group members to complete a purchase. As another example, the method 400 may provide a discount to the group members to incentivize completion of a purchase. As yet another example, the method 400 may direct group members to a call center to assist in completing the purchase.

In an embodiment, whether criteria are met may be automatically determined at the time the Sankey diagram is rendered. For instance, the method may automatically determine whether criteria are met by the Sankey diagram. In an alternative embodiment, whether a criteria is met may be determined manually, e.g., based on user filtering to reach the meeting of the criteria. Upon meeting the criteria, the method may then trigger or "fire" the action. The method 400 may be performed on Sankey diagrams, for example the Sankey diagrams shown in FIGS. 1, 3, and 5.

Figure 5:
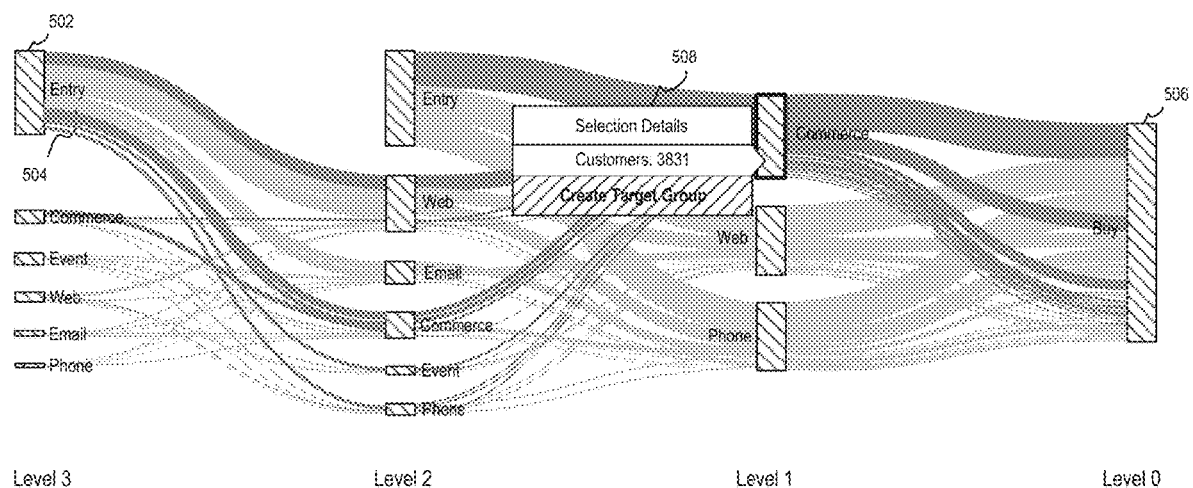
FIG. 5 is a Sankey diagram showing selection details for a node according to an embodiment of the present disclosure.

FIG. 5 is a Sankey diagram 500 showing a node selection function according to an embodiment of the present disclosure. The Sankey diagram 500 may represent a sequence of steps taken in a marketing and purchase process. In such a process, a participant (also referred to as a "customer") may encounter and interact with various platforms and campaigns. The customer may make various decisions and teach various milestones (e.g., commerce, event, web, email, phone, etc.) before ultimately making a purchase. Knowledge about a particular path or journey a customer takes can enable users to appropriately respond to issues that may arise in the path or journey.

The Sankey diagram 500 may include a target event 506, one or more milestones (represented by the shaded boxes), and one or more paths to reach the target event 506. A path may represent a customer experience over time. As shown, a path may traverse one or more milestones (also referred to as nodes) including: commerce, event, web, email, phone, etc. For example, "commerce" may represent a customer visit to an e-commerce website, "event" may represent customer participation in a marketing event such as an online discussion, "web" may represent customer interaction with a type of website such as a social networking website, "email" may represent a customer's reading or interaction with an email message related to the purchase, and "phone" may represent a customer's interaction with customer service. Other milestones are of course possible, including milestones taking place in the real world rather than in the virtual world. An "entry" may represent a step before a milestone, for example a beginning of observing and/or recording a customer's actions.

In an embodiment (as shown), a customer may reach the target event 506 via one or more milestones. Each grouping of milestones is represented as a level in FIG. 5. For example, Level 0 includes the target event; Level 1 includes milestones commerce, web, and phone; Level 2 includes milestones entry, web, email, commerce, event, and phone; and Level 3 includes milestones entry, commerce, event, web, email, and phone. Some customers may make a purchase decision relatively quickly, while others may not. Those customers who make a purchase after an initial contact would be represented by a path between nodes at Level 1 and Level 0 (the purchase). A relatively short path would be one that begins at Level 2 and ends at Level 0, e.g., the path connecting entry (at Level 2), commerce (at Level 1), and buy (at Level 0). Those customers who may take more steps to the target event may be represented by a path at deeper levels.

In an embodiment, a path taken by a customer may be represented by a line connecting two or more nodes, as shown in the Sankey diagram 500. A thickness of a path may represent a density of that path such that the more customers that use that path to reach the target event, the thicker the line. The paths may represent trends in how customers make a purchase.

In an embodiment, the Sankey diagram 500 may be configurable. Methods and systems for configuring the Sankey diagram are further described in the cross-referenced related applications. For example, a user may define a level of detail shown in the diagram, specify a depth-level of the Sankey diagram, etc.

The selection detail box 508 may be a user interface element by which a user selects content for which to perform an automatic action. The selection detail box may include a visual indicator of an associated node. For example, as shown, an arrow indicates the node ("commerce") associated with the selection detail box 508. The selection detail box may include a summary of the selected paths. For example, as shown, the selection detail box include a total number of customers in the selected paths. The selection detail box may include a user interface element to trigger creation of a target group. For example, in FIG. 5, selection of button "create target group" may trigger creation of a target group.

The selection detail box 508 may allow visualization of selected content. The graphical visualization may be more easily comprehended than a table or spreadsheet. For example, when the commerce node is selected, associated paths may be highlighted, as shown in FIG. 5. By sliding over, mousing over, or selecting paths, content may be visualized. For example, additional information about the paths may be displayed responsive to the sliding over, mousing over, or selection. Selecting the "create target group" button may cause customers to be associated with a target group of the visualized content. For example, paths and associated customers may be added to a target group. Actions may be taken for customers associated with the selected paths. In an embodiment, the selection detail box 508 may allow a target group to be quickly and easily created. An action may be taken (e.g., a business object built) for the target group as further described herein.

In operation, the selection detail box 508 may be rendered on a user interface in response to selection of one or more milestones, for example in response to selection of the "commerce" milestone as shown in FIG. 5. That is, in the example shown in FIG. 5, the selection detail box 508 may appear if a user selects the "commerce" milestone highlighted in the Sankey diagram 500.

The selection detail box may advantageously simplify the number of steps or selections a user makes to create a target group and effect an action on the target group. In other words, it is possible to take action on the selected content derived from the click of a node in the Sankey diagram. In the example shown in FIG. 5, those customers that follow the darkened paths are included in a target group such that only the target group will receive the marketing campaign and promotion.

Of course, the concepts illustrated by this example may be applied to other situations. For example, the process can be customized for different business contexts together with different business actions that may be determined dynamically at runtime based on interpretation and association from a setting/customizing table, as described herein.

A Sankey diagram, such as the ones discussed herein, may be rendered based on interactions with a server. In an embodiment, the methods described herein are appropriate for implementation by in-memory databases and processors adapted to operate on such databases. For example, the methods may be implemented by a processor running SAP Advanced Business Application Programming (ABAP®) or the like. The processor may interact with an underlying SAP HANA® database.

Figure 6:
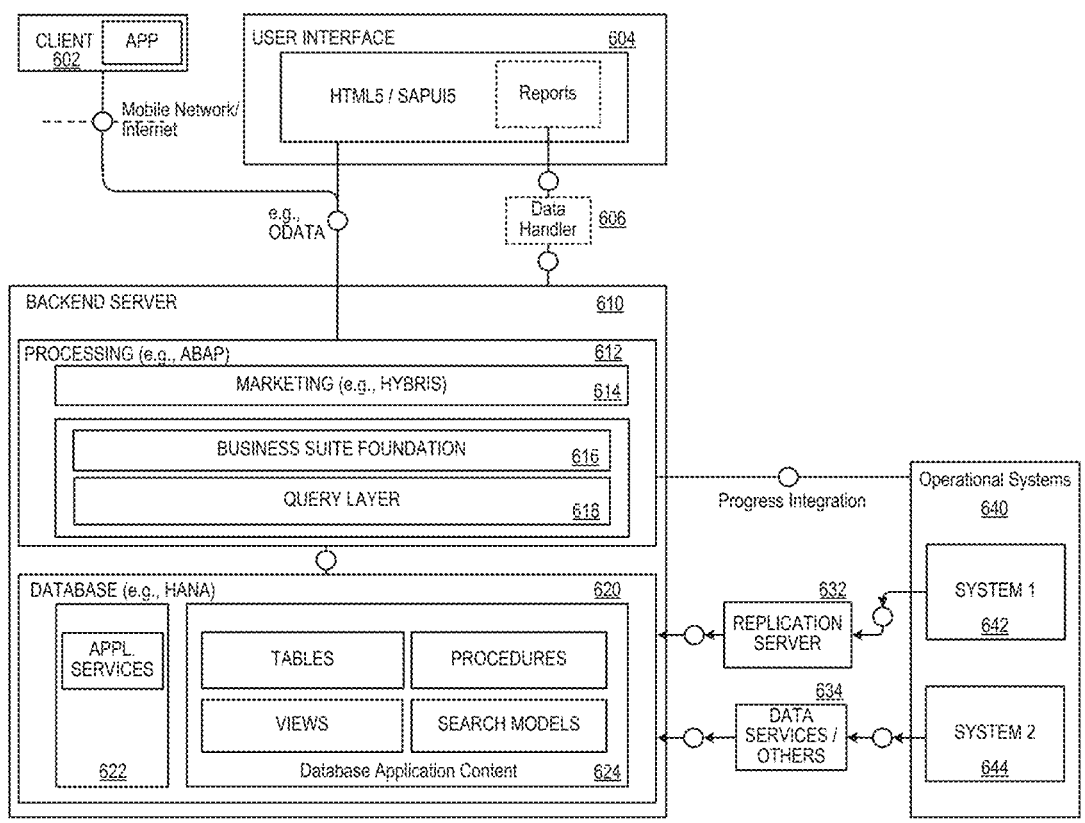
FIG. 6 is a simplified block diagram of a system implementing the methods and systems described herein according to an embodiment of the present disclosure.

FIG. 6 is a system diagram depicting an architectural overview of a networked system 600 suitable for use with embodiments of the present disclosure. As shown in FIG. 6, the networked system 600 includes client device 602, user interface server 604, and backend server 610.

The networked system 600 includes one or more client devices 602, being network accessible via an Internet connection, and connected to a user interface server 604 and a backend server 610. Client device 602 may include a variety of devices such as, for example, a mobile device (e.g., mobile phone or smartphone), a personal computer, a laptop, a tablet, and the like. In addition, client device 602 may host one or more client applications, such as a client journey application.

A client journey application may mine large amounts of user interaction data stored within data sources 620 of backend server 610. The client journey application may utilize such user interaction data to provide and graphically render trends in user interactions for a respective business product according to the methods described herein. For example, when many users buy a product, the client journey application may graphically render various channels (also referred to as paths or links) that customers traverse to purchase the given product. The various purchasing channels and their respective frequencies (e.g., a frequency of use) may be mined from data sources 620, and graphically rendered by a client device 602 of networked system 600.

Client device 602 and user interface server 604 may be configured to exchange data with an enterprise data system, such as a backend server 610. In addition, user interface server 604 may instruct client device 602 to generate and render user interfaces and/or reports based upon the exchanged data. User interface server 604 may utilize a variety of interfaced technologies. Some example interface technologies include HTML5, SAP® UI5, SAP®-WebDynpro, SAP® Gui, Perl, and the like. In addition, the user interface technology may operate in conjunction with business object platforms for visualizing business objects, such as SAP® Business Object Platform (SBOP), SAP® Business Intelligence Platform (SBIP), and the like.

User interface server 604 may generate interface code at runtime. However, depending on the interface technology, some embodiments may implement functions of the user interface server 604 on the client-side. For example, functions of the user interface server 604 may be implemented at the client device 602 on a browser using HTML5, JavaScript, CSS, or on a device using ObjectiveC. Thus, in some implementations, implementation of user interface server 604 may be optional.

The backend server 610 may be configured to process request(s), retrieve data, and/or perform data operations as an appropriate response to a request, and return a response for transmission back to the client device 602 or user interface server 604. In the example configuration depicted in FIG. 6, the backend server 610 may include one or more advanced business application programming (ABAP) modules 612, such as marketing module 614, which may be a Hybris® marketing module. For example, marketing module 614 may be configured to track and store user interactions, such as user shopping history, product browsing history, purchase history, and associated product information. In some instances, marketing module 614 may be further configured to track and store a particular user's interactions across multiple devices of the user. ABAP modules 612 may further include additional modules, such as business suite foundation module 616 and query layer 618 that may be configured to facilitate the exchange of data between the marketing module 614 and database 620.

The backend server 610 may further include one or more data sources 620. In the example depicted in FIG. 600, data source 620 may include application support modules 622 and database content 624 that may include a variety of tables, views, search models, search procedures, and the like. In addition to internal data sources 620, backend server 610 may further be coupled to a variety of external data sources 640. For example, external systems 642 and 644 may be coupled to the backend server 610 via replication server 632 and/or other data services 634, respectively.

Some example external data sources may include transactional information such as contact information, sales activities, quotations, and sales orders from CRM (customer relationship management) and ERP (enterprise resource planning) systems. In some instances, the backend server 610 may aggregate data from multiple backend servers. Within backend server 610, a variety of data, may be quickly aggregated without compromising backend or overall system performance. In some instances, various data may be represented using virtual data models (VDMs) to enable faster data aggregation. Here, a plurality of VDMs may be aggregated into fewer, or even a single VDM. Thus, aggregated data may be presented along one or more displays of a client journey application.

In addition, the backend server 610 may be implemented by or coupled to an in-memory database. In-memory databases are located within the main memory of a computer system or a coupled device, which provides the advantage of faster data access and faster program execution. In-memory databases also enable real-time operation on a computer or device, or on multiple computers or devices communicating through wired or network connections. An example of an in-memory database is the SAP® high-performance analytic appliance (HANA®). However, the embodiments are not limited to any particular in-memory database technology.

The various components networked system 600, such as client device 602, user interface server 604, and backend server 610, may be connected using known and expected network technologies, such as an Internet connection. For example, an OData connection may be used between the client device 602 and other components, such as user interface server 604 and backend server 610. In another example, a data handler 606 may be configured to exchange data between user interface server 604 and backend server 610. Here, the data handler 606 may include SBOP and SBIP functions.

Figure 7A:
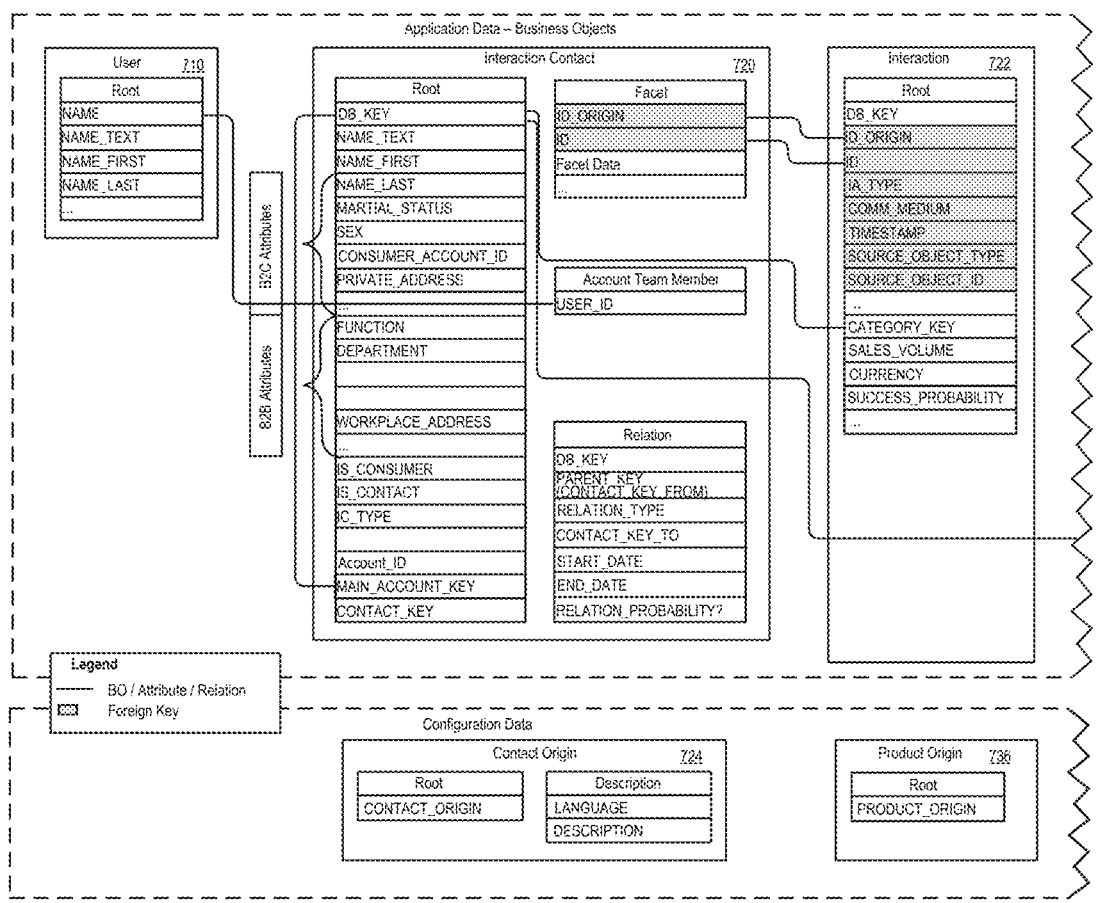
FIG. 7A is a simplified conceptual block diagram of a system implementing the methods and systems described herein according to an embodiment of the present disclosure.
Figure 7B:
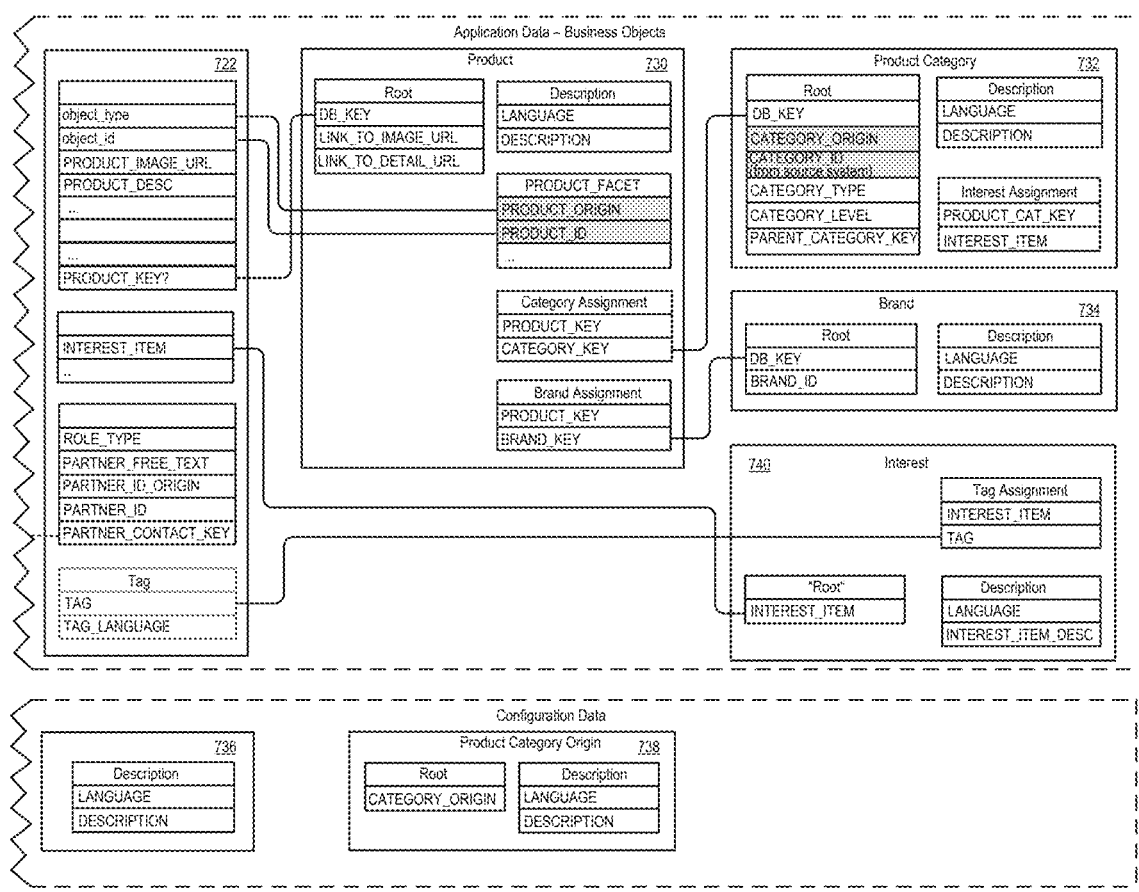
FIG. 7B is a simplified conceptual block diagram of a system implementing the methods and systems described herein according to an embodiment of the present disclosure.

FIG. 7A is a conceptual block diagram depicting an architectural overview of a database 700 according to an example embodiment of the present disclosure. FIG. 7B is a conceptual block diagram depicting an architectural overview of a database 750 according to an example embodiment of the present disclosure. As shown in FIGS. 7A and 7B, the database includes a plurality of application and configuration data tables that may be used to track and store user interactions (e.g., user shopping history, product browsing history, purchase history, and associated product information). Example application data tables include user table 710, interaction contact table 720, interaction table 722, product table 730, product category table 732, brand table 734, and interests table 740. In addition, example configuration tables include contact origin table 724, product origin table 736, and product category origin table 738.

Figure 8:
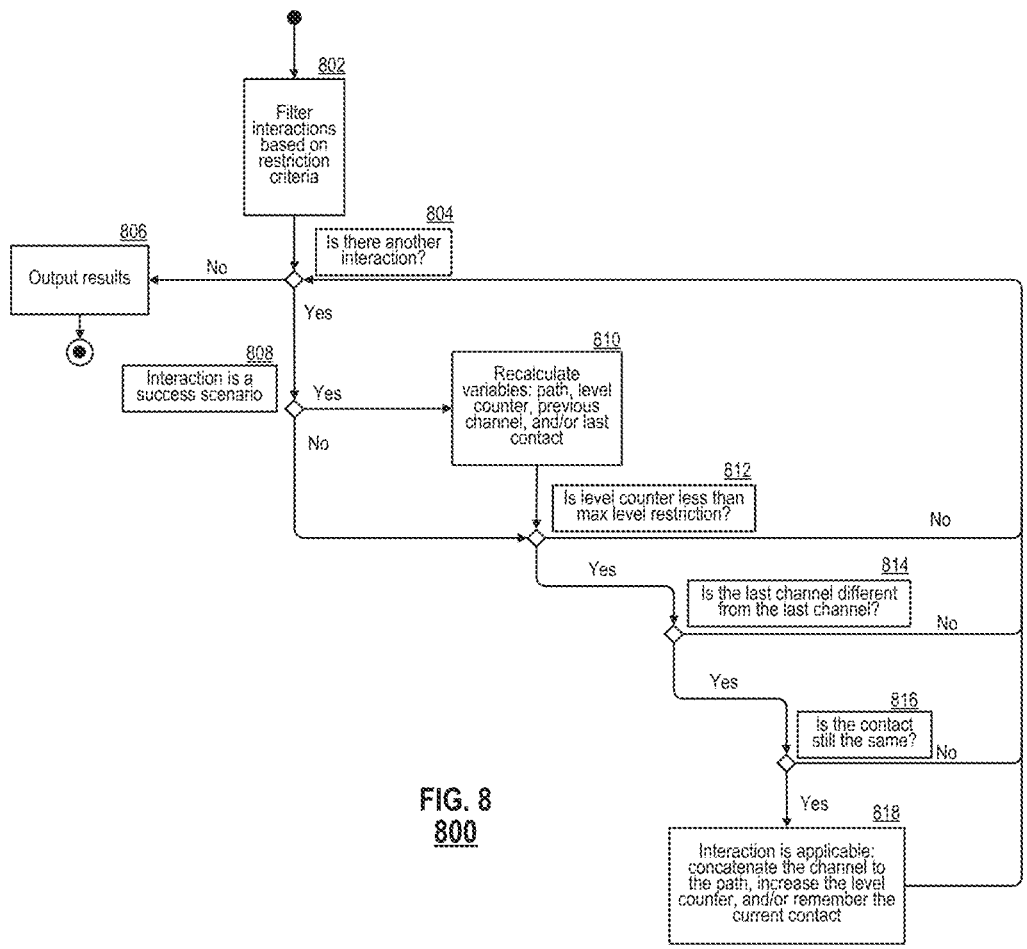
FIG. 8 is flowchart of a method for mining a database to create a Sankey diagram according to an embodiment.

FIG. 8 illustrates a method 800 for mining a database according to an example embodiment of the present invention. At the outset, a user of the client device may filter interactions based on restriction criteria, at 802. For example, restriction criteria may include a particular product, product category, group of products, particular brand, and/or the like.

Next, at 804, the method 800 determines whether another respective interaction has occurred. Here, the method 800 may periodically determine whether other respective interactions have occurred. Alternatively, step 804 may be triggered by a change to one of the data sources. If no other respective interactions have occurred, the method 800 may proceed to output search results, at 806. As discussed above, the search results may be supplied to a requesting user interface server and/or client device. If another respective interaction has occurred, the method 800 may proceed to 808.

At 808, the method 800 determines whether the respective interaction is a success scenario (e.g., purchase of a product). If the respective interaction is a success scenario, one or more variables (e.g., path, level counter, previous channel, last contact, and/or the like) used for graphically rendering the user interaction data may be recalculated at 810. In an embodiment, after the recalculation, the method 800 may proceed to steps 812-816. In an embodiment, if the interaction is not a success scenario, the method 800 may proceed to steps 812-816.

At step 812, the level counter variable may be compared to a maximum level restriction. For example, the comparison of the level counter to a maximum level restriction may be used to ensure that a frequently traversed journey does not visually obstruct other journeys, if graphically rendered. If the level counter is not less than a maximum level restriction, the method 800 may proceed to output results, at 806. On the other hand, if the level counter is less than a maximum level restriction, the method 800 may proceed to 814.

At 814, the method 800 determines whether a respective interaction has changed channels. In other words, the method 800 determines whether the previous channel of the respective interaction is the same as its current channel. If the channel has not changed, the method 800 may proceed to output results, at 806. On the other hand, if the channel has changed, the method 800 may proceed to 816.

At 816, the method 800 determines whether contact information for the respective interaction has changed. If the contact information has not changed, the method 800 may proceed to output results, at 806. On the other hand, if the contact information has changed, the method 800 may proceed to 818. At 818, the method 800 may concatenate the channel to the path, increase the level counter, and/or store contact information. The method 8100 may then proceed to output results at 806.

While the description here pertains to construction and manipulation of a Sankey diagram in a marketing context, the concepts described here apply as well to other applications, for example processes in which a process participant has one or more interactions or milestones that can be tracked, stored, analyzed, and depicted in a visual representation or interpretation. For example, the concepts apply as well to supply chain operation and management, and monitoring electricity grid performance, and the like. For instance, methods and systems may construct, render, and update a Sankey diagram of a supply chain or power outage map, which methods and systems may benefit from improved computer operating efficiency.

Representing data in a Sankey diagram in the manner described herein has many advantages. For instance, data that would other be presented in a table and be cumbersome or tedious to understand may instead be presented in a Sankey diagram, which may allow for understanding of the trajectory of actions of a customer or a group of customers as well as a density of customer interactions.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As used in the appended claims, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement storage apparatus such as databases. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the disclosure.

What is claimed is:

1. A computer-implemented method, comprising:
   rendering a Sankey diagram in a graphical user interface executed on a client device, the client device interacting with a backend server;
   creating, in response to user-generated input received via the graphical user interface, a group based on elements of the Sankey diagram;
   populating, in the graphical user interface, the group with those elements of the Sankey diagram meeting a member criteria;
   associating an action with the group;
   determining that the group meets a group criteria;
   triggering the associated action in response to the determination that the group meets the group criteria; and
   modifying information in the graphical user interface according to a user customization of the Sankey diagram, the user customization comprising: user-generated input via the graphical user interface requesting a change in visualization data for a top journeys criteria;
   wherein:
   visualization data comprising journeys is rendered in the Sankey diagram
   the requested change in visualization data is triggered by a resizing of a window on a device displaying the journeys;
   the requested change in visualization data is triggered by a revised entry in a top journeys criteria;

a top journey calculation for an xth pattern is equal to F(x):

[(R(x)−1)/(N−1)], wherein x is a pattern number, R(x) is a rank of pattern x, and N is a total number of patterns.

2. The method of claim 1, wherein the Sankey diagram includes a target event, at least one node to represent a milestone in a journey, and at least one path connecting the at least one node to the target event.

3. The method of claim 2, wherein the user-generated input comprises an instruction that includes selection of at least one of the at least one node.

4. The method of claim 3, wherein the instruction includes a marketing area for which to trigger the action.

5. The method of claim 2, wherein the selection causes rendering of a group dialog user interface element for inputting additional detail regarding formation of the group.

6. The method of claim 2, wherein the selection causes rendering of a selection detail user interface element for selecting at least one of the at least one path for inclusion in the group.

7. The method of claim 6, wherein a selected path of the at least one path is visually differentiated from unselected paths of the Sankey diagram.

8. The method of claim 1, wherein the group criteria includes at least one of: a sequence of nodes, density of customers associated with a node, and a business context.

9. The method of claim 1, wherein the group includes customers who have an item in a shopping cart but have not yet checked out and the action includes sending a message over a computer network to the customers.

10. The method of claim 1, wherein the group is automatically populated based on satisfaction of the member criteria.

11. The method of claim 1, wherein the group is manually populated based on manipulation of the Sankey diagram to satisfy the member criteria.

12. The method of claim 1, wherein the action is automatically associated with the group.

13. The method of claim 1 wherein:
the backend server aggregates from multiple sources using a virtual data model;
the action comprising building a business object that causes a communication to be sent to each of a plurality of users associated with the group.

14. A system to automatically perform an action, the system comprising:
a repository storing a Sankey diagram, the repository being accessible by components for triggering an action; and
a processor configured to:
render the Sankey diagram in a graphical user interface executed on a client device, the client device interacting with a backend server;
create, in response to user-generated input received via the graphical user interface, a group based on elements of the Sankey diagram;
populate, in the graphical user interface, the group with those elements of the Sankey diagram meeting a member criteria;
associate the action with the group;
determine that the group meets a group criteria;
trigger the associated action in response to the determination that the group meets the group criteria; and
modify information in the graphical user interface according to a user customization of the Sankey diagram, the user customization comprising: user-generated input via the graphical user interface requesting a change in visualization data for a top journeys criteria;
wherein:
visualization data comprising journeys is rendered in the Sankey diagram the requested change in visualization data is triggered by a resizing of a window on a device displaying the journeys;
the requested change in visualization data is triggered by a revised entry in a top journeys criteria;
a top journey calculation for an xth pattern is equal to F(x): [(R(x)−1)/(N−1)], wherein x is a pattern number, R(x) is a rank of pattern x, and N is a total number of patterns.

15. The system of claim 14, wherein the group is automatically populated based on satisfaction of the member criteria.

16. The method of claim 14, wherein the action is automatically associated with the group.

17. The system of claim 14 wherein:
the backend server aggregates from multiple sources using a virtual data model;
the action comprising building a business object that causes a communication to be sent to each of a plurality of users associated with the group.

18. A non-transitory computer-readable medium storing program instructions that, when executed, cause a processor to automatically perform an action, the method comprising:
rendering a Sankey diagram in a graphical user interface executed on a client device, the client device interacting with a backend server;
creating, in response to user-generated input received via the graphical user interface, a group based on elements of the Sankey diagram;
populating, in the graphical user interface, the group with those elements of the Sankey diagram meeting a member criteria;
associating an action with the group;
determining that the group meets a group criteria;
triggering the associated action in response to the determination that the group meets the group criteria; and
modifying information in the graphical user interface according to a user customization of the Sankey diagram, the user customization comprising: user-generated input via the graphical user interface requesting a change in visualization data for a top journeys criteria;
wherein:
visualization data comprising journeys is rendered in the Sankey diagram the requested change in visualization data is triggered by a resizing of a window on a device displaying the journeys;
the requested change in visualization data is triggered by a revised entry in a top journeys criteria;
a top journey calculation for an xth pattern is equal to F(x):

[(R(x)−1)/(N−1)], wherein x is a pattern number, R(x) is a rank of pattern x, and N is a total number of patterns.

19. The non-transitory computer-readable medium of claim 18, wherein the group is automatically populated based on satisfaction of the member criteria.

20. The non-transitory computer-readable medium of claim 18, wherein the action is automatically associated with the group.

* * * * *